US012146209B2

(12) United States Patent
Harada et al.

(10) Patent No.: US 12,146,209 B2
(45) Date of Patent: Nov. 19, 2024

(54) NON-ORIENTED ELECTRICAL STEEL SHEET AND METHOD FOR MANUFACTURING SLAB USED AS MATERIAL FOR THE SAME

(71) Applicant: JFE Steel Corporation, Tokyo (JP)

(72) Inventors: Akifumi Harada, Tokyo (JP); Akitoshi Matsui, Tokyo (JP); Yoshihiko Oda, Tokyo (JP); Tomoyuki Okubo, Tokyo (JP); Masanori Uesaka, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 677 days.

(21) Appl. No.: 17/281,075

(22) PCT Filed: Sep. 5, 2019

(86) PCT No.: PCT/JP2019/034879
§ 371 (c)(1),
(2) Date: Mar. 29, 2021

(87) PCT Pub. No.: WO2020/071048
PCT Pub. Date: Apr. 9, 2020

(65) Prior Publication Data
US 2021/0332463 A1  Oct. 28, 2021

(30) Foreign Application Priority Data
Oct. 2, 2018  (JP) ................................ 2018-187234

(51) Int. Cl.
| | |
|---|---|
| *C22C 38/06* | (2006.01) |
| *B22D 11/00* | (2006.01) |
| *C22B 9/04* | (2006.01) |
| *C22C 38/00* | (2006.01) |
| *C22C 38/02* | (2006.01) |
| *C22C 38/04* | (2006.01) |

(52) U.S. Cl.
CPC ............ *C22C 38/06* (2013.01); *B22D 11/001* (2013.01); *C22B 9/04* (2013.01); *C22C 38/001* (2013.01); *C22C 38/002* (2013.01); *C22C 38/005* (2013.01); *C22C 38/02* (2013.01); *C22C 38/04* (2013.01)

(58) Field of Classification Search
CPC ............ C22C 38/005; C22B 9/04; C21D 8/12
See application file for complete search history.

(56) References Cited

U.S. PATENT DOCUMENTS

| | | | | |
|---|---|---|---|---|
| 2001/0037841 | A1* | 11/2001 | Murakami | ............... C21D 8/12 148/306 |
| 2014/0216606 | A1 | 8/2014 | Heo et al. | |
| 2018/0119258 | A1* | 5/2018 | Fujikura | ................... H01F 1/16 |
| 2019/0017138 | A1* | 1/2019 | Uesaka | ................ C21D 8/1233 |

FOREIGN PATENT DOCUMENTS

| | | |
|---|---|---|
| CN | 101045979 A | 10/2007 |
| CN | 107109563 A | 8/2017 |
| CN | 107794439 A | 3/2018 |
| EP | 2316978 A1 | 5/2011 |
| EP | 3214198 A1 | 9/2017 |
| EP | 3239321 A1 | 11/2017 |
| EP | 3263719 A1 | 1/2018 |
| EP | 3290539 A1 | 3/2018 |
| EP | 3388537 A1 | 10/2018 |
| JP | 5943814 A | 3/1984 |
| JP | 2002146493 A | 5/2002 |
| JP | 4276613 B2 | 6/2009 |
| JP | 2014173099 A | 9/2014 |
| JP | 5790953 B2 | 10/2015 |
| JP | 2016047943 A | 4/2016 |
| JP | WO2016175121 | * 11/2016 |
| JP | WO2017122761 | * 7/2017 |
| JP | 2017137537 A | 8/2017 |
| JP | 2018066033 | * 4/2018 |
| JP | 2018066033 A | 4/2018 |
| RU | 2467826 C2 | 11/2012 |
| RU | 2665645 C1 | 9/2018 |
| TW | 201700750 A | 1/2017 |

(Continued)

OTHER PUBLICATIONS

Russian Search Report for Russian Application No. 2021109002, dated Nov. 26, 2021, with translation, 4 pages.
Office Action for Korean Application No. 10-2021-7009549, dated Oct. 20, 2022 with Concise Statement of Relevance of Office Action, 5 pages.
International Search Report and Written Opinion for International Application No. PCT/JP2019/034879, dated Dec. 3, 2019, 7 pages.
Chinese Office Action with Search Report for Chinese Application No. 201980064888.6, dated Sep. 6, 2021, 11 pages.

(Continued)

*Primary Examiner* — Nicholas A Wang
(74) *Attorney, Agent, or Firm* — Buchanan Ingersoll & Rooney PC

(57) ABSTRACT

Provided is a non-oriented electrical steel sheet having such a low Al concentration so that it is excellent in terms of the recycling efficiency of scrap iron and having a high magnetic flux density and low iron loss.

The non-oriented electrical steel sheet according to the present invention has a chemical composition containing C; 0.0050 mass % or less, Si; 1.5 mass % to 5.0 mass %, Mn; 0.2 mass % to 3.0 mass %, sol.Al; 0.0030 mass % or less, P; 0.2 mass % or less, S; 0.0050 mass % or less, N; 0.0040 mass % or less, T.Ca; 0.0010 mass % to 0.0080 mass %, T.O; 0.0100 mass % or less, REM; 0.0001 mass % to 0.0050 mass %, and a balance of Fe and inevitable impurities, in which a value of a mass-related fractional expression ((T.Ca+REM)/(T.O+S)), which is a relational expression for the masses of the four constituents described above, that is, T.Ca, REM, T.O, and S, is 0.4 or more.

8 Claims, No Drawings

(56) References Cited

FOREIGN PATENT DOCUMENTS

| | | |
|---|---|---|
| TW | 201720935 A | 6/2017 |
| WO | 2016136095 A1 | 9/2016 |
| WO | 2017122761 A1 | 7/2017 |

OTHER PUBLICATIONS

Russian Office Action for Russian Application No. 2021109002, dated Aug. 25, 2021, with translation, 13 pages.
Japanese Office Action for Japanese Application No. 2020-514767, dated Jan. 19, 2021 with Concise Statement of Relevance of Office Action, 6 pages.
Japanese Office Action for Japanese Application No. 2020-514767, dated May 11, 2021 with Concise Statement of Relevance of Office Action, 5 pages.
Taiwan Office Action for Taiwan Application No. 108133311, dated Apr. 13, 2020 with English Search Report, 5 pages.
Chinese Office Action for Chinese Application No. 201980064888.6, dated Dec. 24, 2021, with Concise Statement of Relevance of Office Action, 6 pages.

* cited by examiner

NON-ORIENTED ELECTRICAL STEEL SHEET AND METHOD FOR MANUFACTURING SLAB USED AS MATERIAL FOR THE SAME

CROSS REFERENCE TO RELATED APPLICATIONS

This is the U.S. National Phase application of PCT/JP2019/034879, filed Sep. 5, 2019, which claims priority to Japanese Patent Application No. 2018-187234, filed Oct. 2, 2018, the disclosures of each of these applications being incorporated herein by reference in their entireties for all purposes.

FIELD OF THE INVENTION

The present invention relates to a non-oriented electrical steel sheet, which is used as an iron-core material for electric devices or the like, and a method for manufacturing a slab used as a material for the steel sheet.

BACKGROUND OF THE INVENTION

Nowadays, in response to growing awareness of energy saving, a motor used for a household air conditioner or the like is required to have reduced power consumption and reduced energy loss. Therefore, since a non-oriented electrical steel sheet, which is used as an iron-core material for a motor, is also strongly required to have high magnetic properties such as low iron loss for reducing the iron loss of a motor and to have a high magnetic flux density for reducing the copper loss of a motor, many steel sheets having excellent magnetic properties are being developed. At the same time, there is a demand for a technique at a refining stage not only for appropriately preparing molten steel having a required chemical composition for steel having high magnetic properties but also for controlling the chemical compositions and morphology of non-metallic inclusions (oxide-based inclusions and sulfide-based inclusions) in steel.

In the case of a non-oriented electrical steel sheet, since crystal grain growth is inhibited in the stage of finish annealing when, in addition to oxide-based inclusions, sulfide-based inclusions having comparatively small grain diameter such as MnS exist, controlling the morphology of sulfide-based inclusions having a small grain diameter is important from the viewpoint of product properties. Therefore, to date, techniques for rendering sulfide-based inclusions having small grain diameter such as MnS harmless by adding various elements have been proposed.

For example, Patent Literature 1 proposes a non-oriented electrical steel sheet having a high magnetic flux density, in which, by decreasing the Al (aluminum) concentration in steel, and by adding Ca (calcium), oxide-based inclusions are controlled to have specific chemical compositions, and S (sulfur) in steel is fixed in the form of CaS.

Patent Literature 2 proposes a non-oriented electrical steel sheet having low iron loss, in which, by adding Al in an amount of 0.1 mass % to 3 mass %, and by adding rare earth metals (hereinafter, referred to as "REM"), S in steel is fixed. Here, the term "REM" is a generic term used to refer to 17 elements including 15 elements having atomic numbers of 57 (La, that is, lanthanum) through 71 (Lu, that is, lutetium), Sc (scandium) having an atomic number of 21, and Y (yttrium) having an atomic number of 39. The technique according to Patent Literature 2 is a technique in which, after molten steel is deoxidized by utilizing Al, CaO is added to reform oxide-based inclusions into $CaO$–$Al_2O_3$-based inclusions, and REM is thereafter added so that the REM concentration is within a specified range, thereby not only controlling the precipitation morphology of TiN through the addition of REM but also preventing the occurrence of clogging in tundish nozzles by REM oxides and the like.

In addition, Patent Literature 3 proposes a non-oriented electrical steel sheet having high strength, the steel sheet having a chemical composition containing Al in an amount of 0.05 mass % to 3.0 mass % and Cu (copper) in an amount of 1.0 mass % to 3.5 mass %, in which S in steel is fixed by utilizing Ca, REM, and Mg (magnesium). Patent Literature 3 states that, since Mg also preferentially forms sulfides at a high temperature, sulfides having a large grain diameter are formed in molten steel, which results in an improvement in crystal grain growth capability.

PATENT LITERATURE

PTL 1: Japanese Patent No. 5790953
PTL 2: Japanese Patent No. 4276613 PTL 3: Japanese Unexamined Patent Application Publication No. 2017-137537

SUMMARY OF THE INVENTION

However, the conventional techniques described above have the following problems.

That is, in the case of Patent Literature 1, since Ca is an element which has a low addition yield rate when Ca is added to molten steel, there may be a case where there is a decrease in Ca concentration in molten steel due to a variation in operation conditions. In such a case, or in the case where there is an increase in the T.O (total oxygen) concentration in molten steel, since oxide-based inclusions are not sufficiently reformed, a low-melting-point chemical composition is formed. As a result, since oxide-based inclusions are elongated in the rolling direction when hot rolling is performed, crystal grain growth is inhibited when annealing is performed, which results in a decrease in crystal grain diameter. Therefore, magnetic domain wall motion is inhibited, which results in a problem of a deterioration in iron loss. In particular, in the case where there is a decrease in Al concentration in steel, since there is increased difficulty in sufficiently decreasing the amounts of dissolved oxygen and S in steel when a refining process is performed on molten steel, there is a risk in that it is not possible to sufficiently control the morphology of oxide-based inclusions and sulfide-based inclusions in a steel sheet.

In the case of Patent Literature 2, since the Al concentration in steel is basically high, there is a problem of a decrease in magnetic flux density. On the other hand, in the case where the Al concentration is within the lower subrange of the specified range, since controlling the morphology of oxide-based inclusions through the addition of CaO is not effective, it is necessary to use a technique for effectively controlling the morphology of oxide-based inclusions and sulfide-based inclusions in steel. In addition, regarding the control of the morphology of oxide-based inclusions, since consideration is given to the concentrations of various constituents in molten steel from the viewpoint of utilization as the precipitation nuclei of TiN and inhibiting nozzle clogging, there is a problem of oxide-based inclusions having such a low-melting-point chemical composition that they are elongated when rolling is performed depending on the conditions such as the REM concentration, the O (oxygen) concentration, the S concentration, and the like in steel, although it is possible to inhibit the precipitation of MnS, because S in steel is fixed by utilizing REM.

In the case of Patent Literature 3, regarding the effects of the additive elements such as Ca, REM, and Mg, consideration is given only to controlling the morphology of sulfide-based inclusions, and there is no clear mention of conditions required for controlling the morphology of oxide-based inclusions. Therefore, in the case of Patent Literature 3 as in the case of Patent Literature 2, there is a risk of oxide-based inclusions having such a low-melting-point chemical composition that they are elongated when rolling is performed depending on the conditions such as the concentrations of such elements, the O (oxygen) concentration, the S concentration, and the like in steel.

The present invention has been completed in view of the situation described above, and an object of the present invention is to provide a non-oriented electrical steel sheet having such a low Al concentration that it is excellent in terms of the recycling efficiency of scrap iron and having a high magnetic flux density and low iron loss and to propose a method for manufacturing a slab used as a material for such a non-oriented electrical steel sheet.

To solve the problems described above, the present inventors diligently conducted investigations focusing on the effects of the chemical composition of a non-oriented electrical steel sheet, the chemical compositions of inclusions, and a method for manufacturing a slab used as a material for the non-oriented electrical steel sheet on the magnetic properties of the non-oriented electrical steel sheet product.

As a result, it was found that inhibiting the precipitation of sulfide-based inclusions having a small grain diameter such as MnS in steel and controlling the chemical compositions of oxide-based inclusions and oxysulfide-based inclusions in steel to be non-elongatable chemical compositions are important for obtaining the non-oriented electrical steel sheet described above and that controlling the values of the mass-related fractional expressions ((T.Ca+REM)/(T.O+S)) and (T.Ca/REM), which are relational expressions for the masses of constituents in steel, to be within an appropriate range is important for increasing the magnetic flux density of the non-oriented electrical steel sheet and for reducing the iron loss of the steel sheet. Moreover, it was found that using an appropriate method for manufacturing a slab used as a material for the non-oriented electrical steel sheet is effective for controlling the morphology of inclusions in steel.

The present invention has been completed on the basis of the knowledge, and the subject matter of embodiments of the present invention is as follows.

[1] A non-oriented electrical steel sheet having a chemical composition containing C; 0.0050 mass % or less, Si; 1.5 mass % to 5.0 mass %, Mn; 0.2 mass % to 3.0 mass %, sol.Al; 0.0030 mass % or less, P; 0.2 mass % or less, S; 0.0050 mass % or less, N; 0.0040 mass % or less, T.Ca; 0.0010 mass % to 0.0080 mass %, T.O; 0.0100 mass % or less, REM; 0.0001 mass % to 0.0050 mass %, and a balance of Fe and inevitable impurities, in which a value of a mass-related fractional expression ((T.Ca+REM)/(T.O+S)), which is a relational expression for masses of four constituents including T.Ca, REM, T.O, and S, is 0.4 or more.

[2] A non-oriented electrical steel sheet having a chemical composition containing C; 0.0050 mass % or less, Si; 1.5 mass % to 5.0 mass %, Mn; 0.2 mass % to 3.0 mass %, sol.Al; 0.0030 mass % or less, P; 0.2 mass % or less, S; 0.0050 mass % or less, N; 0.0040 mass % or less, T.Ca; 0.0010 mass % to 0.0080 mass %, T.O; 0.0100 mass % or less, REM; 0.0001 mass % to 0.0050 mass %, at least one of element group A through element group C below, and a balance of Fe and inevitable impurities, in which a value of a mass-related fractional expression ((T.Ca+REM)/(T.O+S)), which is a relational expression for masses of four constituents including T.Ca, REM, T.O, and S, is 0.4 or more.

Here, group A consists of one or both selected from Sn and Sb each in an amount of 0.01 mass % to 0.1 mass %, group B consists of Mg in an amount of 0.0001 mass % to 0.0050 mass %, and group C consists of one, two, or all selected from Cu, Ni, and Cr each in an amount of 0.01 mass % to 0.5 mass %.

[3] The non-oriented electrical steel sheet according to item [1] or [2] above, in which a value of a mass-related fractional expression (T.Ca/REM), which is a relational expression for masses of two constituents including T.Ca and REM, is 1.0 or more.

[4] The non-oriented electrical steel sheet according to any one of items [1] to [3] above, in which an average crystal grain diameter of a metallographic structure is 40 µm or more.

[5] A method for manufacturing a slab used as a material for a non-oriented electrical steel sheet having a chemical composition containing Si, REM, and Ca, in a process of refining molten steel, which has been tapped from a converter or an electric arc furnace, by using a vacuum degassing apparatus, adding a Ca-containing alloy to the refined molten steel, and continuously casting the molten steel, to which the Ca-containing alloy has been added, by using a continuous casting machine to obtain a slab, the method comprising:

adding metallic Si or a Si-containing alloy to the molten steel during the refining performed by using the vacuum degassing apparatus to deoxidize the molten steel by utilizing Si;

adding a REM-containing alloy to the molten steel, which has been deoxidized by utilizing Si, during the refining performed by using the vacuum degassing apparatus or after finishing the refining performed by using the vacuum degassing apparatus; and adding a Ca-containing alloy to the molten steel, to which the REM-containing alloy has been added, in a ladle.

In the case of the non-oriented electrical steel sheet according to embodiments of the present invention, by controlling the value of the mass-related fractional expression ((T.Ca+REM)/(T.O+S)), which is a relational expression for the masses of the four constituents in steel, that is, T.Ca, REM, T.O, and S, to be 0.4 or more, the formation of elongated sulfide-based inclusions in steel is inhibited, and it is possible to control oxide-based inclusions in steel to have a granular non-elongated morphology. With this, it is possible to provide a non-oriented electrical steel sheet having a high magnetic flux density and low iron loss and having such a low sol.Al concentration of 0.0030 mass % or less so that it is excellent in terms of the recycling efficiency of scrap iron.

In addition, in the case of the method for manufacturing a slab used as a material for the non-oriented electrical steel sheet according to embodiments of the present invention, since a REM-containing alloy is added after molten steel has been deoxidized by utilizing Si, it is possible to add the REM-containing alloy to the molten steel at a high yield rate. In addition, since a Ca-containing alloy is added after the REM-containing alloy has been added, since it is possible to fix and remove S (sulfur) through the addition of REM, it is possible to manufacture a slab used as a material for a non-oriented electrical steel sheet at low cost.

DETAILED DESCRIPTION OF EMBODIMENTS OF THE INVENTION

Hereafter, embodiments of the present invention will be described in detail.

The present inventors manufactured a slab used as a material for a non-oriented electrical steel sheet having a chemical composition containing C; 0.0050 mass % or less, Si; 1.5 mass % to 5.0 mass %, Mn; 0.2 mass % to 3.0 mass %, sol.Al; 0.0030 mass % or less, P; 0.2 mass % or less, S; 0.0050 mass % or less, N; 0.0040 mass % or less, T.Ca (total calcium); 0.0010 mass % to 0.0080 mass %, T.O (total oxygen); 0.0100 mass % or less, REM; 0.0001 mass % to 0.0050 mass %, and a balance of Fe and inevitable impurities by using a continuous casting machine after having performed refining by using a vacuum degassing apparatus on molten steel tapped from a converter, manufactured a product steel sheet (finish-annealed steel sheet) by using the obtained slab as a material, and evaluated the relationship between the chemical composition of steel and the iron loss represented by $W_{15/50}$ in the state of the product steel sheet. Here, the expression "REM concentration" denotes, in the case where a REM-containing alloy containing Ce (cerium), La (lanthanum), Nd (neodymium), and Pr (praseodymium) is added, the total concentration of these elements.

As a result, a correlation was found between the chemical composition of steel and the iron loss $W_{15/50}$. From the results of additional investigations performed on the product steel sheet, it was found that non-metallic inclusions (oxide-based inclusions and sulfide-based inclusions) which were observed in a product steel sheet had various morphologies depending on the chemical composition of steel, and inclusions having a granular morphology, inclusions having a morphology elongated in the rolling direction, and the like were observed.

That is, in the case of good iron loss $W_{15/50}$, the T.Ca concentration and the REM concentration in steel were high in comparison with the T.O concentration and the S concentration, and many of the oxide-based inclusions observed had a granular non-elongated morphology. On the other hand, in the case of poor iron loss $W_{15/50}$, the T.Ca concentration and the REM concentration in steel were low in comparison with the T.O concentration and the S concentration, and many of the oxide-based inclusions observed had a morphology elongated in the rolling direction.

In the case of the non-oriented electrical steel sheet for which the present invention is intended, since the Si concentration in steel is high, and since a Ca-containing alloy and a REM-containing alloy are added, oxide-based inclusions in the steel formed are basically $CaO$—$SiO_2$-based inclusions containing REM oxides. In addition, since $Al_2O_3$ existing in slag in a ladle is reduced by Si, Ca, and REM in steel, Al may be generated in molten steel, which results in $Al_2O_3$ being also included in oxide-based inclusions.

Elongated oxide-based inclusions have a lower CaO concentration and REM oxide concentration and a higher $Al_2O_3$ concentration than non-elongated granular oxide-based inclusions. This is considered to be because, since the T.Ca concentration or the REM concentration is not sufficient, the oxide-based inclusions have low-melting-point chemical compositions, which results in the inclusions being elongated in the rolling direction when hot rolling is performed. It is considered that, since such oxide-based inclusions are broken when cold rolling is performed, there is a decrease in crystal grain diameter due to the crystal grain growth in a non-oriented electrical steel sheet being inhibited when annealing is performed, which results in a deterioration in iron loss $W_{15/50}$ due to magnetic domain wall motion being inhibited.

In addition, regarding sulfide-based inclusions, CaS, MnS, and REM sulfides were observed. In particular, elongated sulfide-based inclusions had high MnS concentration in inclusions and were finely precipitated in crystal grains. From these observations, it was found that, in the case where the T.Ca concentration or the REM concentration is insufficient, there is a failure in controlling the morphology of sulfide-based inclusions, thereby contributing to a deterioration in iron loss $W_{15/50}$.

From the results described above, it was found that, to achieve good iron loss $W_{15/50}$, it is necessary to control the chemical composition of oxide-based inclusions to be a high-melting-point chemical composition and to inhibit the formation of sulfide-based inclusions having a small grain diameter such as MnS. That is, it was found that it is necessary to sufficiently increase the T.Ca concentration and the REM concentration in comparison with the T.O concentration and the S concentration in steel.

Increasing the T.Ca concentration and the REM concentration means increasing the CaO concentration and the REM oxide concentration in oxide-based inclusions, and this contributes to increasing the melting point of the oxide-based inclusions. In addition, regarding sulfide-based inclusions, by adding Ca and REM, it is possible to fix S in the forms of CaS and REM sulfides in molten steel while there is no effect on crystal grain growth, because there is an increase in the grain diameter of the sulfides due to the sulfides being formed at a high temperature.

Moreover, in the case where REM oxides are included in $CaO$—$SiO_2$-based oxide-based inclusions, since there is an increase in the sulfide capacity of the oxide-based inclusions, it is expected that it is possible to utilize the oxide-based inclusions as precipitation nuclei of sulfides. In the case where sulfides are precipitated on oxide-based inclusions, since there is a decrease in the amount of sulfide-based inclusions precipitated in crystal grains, it is expected that there is an improvement in magnetic properties.

From the viewpoint described above, the relationship between the chemical composition of steel and the chemical composition of non-metallic inclusions in the investigations described above was summarized. As a result, it was found that the value of the mass-related fractional expression ((T.Ca+REM)/(T.O+S)), which is a relational expression for the masses of the four constituents in steel, that is, T.Ca, REM, T.O, and S, should be within an appropriate range. That is, it was found that, in the case where the value of the mass-related fractional expression ((T.Ca+REM)/(T.O+S)), which is a relational expression for the masses of the four constituents in steel, is less than 0.4, since the Ca concentration and the REM concentration are not sufficient to increase the melting point of oxide-based inclusions or to inhibit the formation of MnS, it is not possible to avoid the formation of low-melting-point oxide-based inclusions and MnS, which results in a deterioration in iron loss $W_{15/50}$. Therefore, in the case of the non-oriented electrical steel sheet according to embodiments of the present invention, it is necessary that the value of the mass-related fractional expression ((T.Ca+REM)/(T.O+S)), which is a relational expression for the masses of the four constituents in steel, be controlled to be 0.4 or more, preferably 0.8 or more, or more preferably 1.2 or more.

In addition, from the results of additional investigations, it was also found that the value of a certain relational expression for the T.Ca concentration and the REM concentration in steel should be within an appropriate range. That is, it was found that, in the case where the value of the mass-related fractional expression (T.Ca/REM), which is a relational expression for the masses of the two constituents in steel, that is, T.Ca and REM, is less than 1.0, since there is an increase in the REM oxide concentration in oxide-based inclusions, there is a decrease in the melting point of the oxide-based inclusions. In addition, in the case where an excessive amount of REM-containing alloy is added, there is an increase in cost. Therefore, it is preferable that REM plays only a supplementary role to Ca. Therefore, in the case of the non-oriented electrical steel sheet according to the present invention, it is preferable that the value of the mass-related fractional expression (T.Ca/REM), which is a relational expression for the masses of the two constituents in steel, be controlled to be 1.0 or more.

In addition, from the viewpoint of a metallographic structure, it was found that, in the case where the average crystal grain diameter of a non-oriented electrical steel sheet is less than 40 μm, since there is a deterioration in iron loss, it may not be possible to stably achieve good magnetic properties. Therefore, in the present invention, it is preferable that the average crystal grain diameter of the non-oriented electrical steel sheet be 40 μm or more or more preferably 70 μm or more. Here, the term "average crystal grain diameter" in the present description denotes the average value of the crystal grain diameters which are determined in a cross section in the thickness direction parallel to the rolling direction at a central position in the width direction of a non-oriented electrical steel sheet.

Moreover, it was also found that, when the non-oriented electrical steel sheet having the chemical composition described above is manufactured, an appropriate method for manufacturing a slab used as a material for the non-oriented electrical steel sheet should be used. That is, to obtain an excellent product steel sheet in terms of iron loss, it was found that, as described above, it is necessary to control the value of the mass-related fractional expression ((T.Ca+REM)/(T.O+S)), which is a relational expression for the masses of the four constituents in steel, to be 0.4 or more and that the timing of addition of a REM-containing alloy to molten steel in a refining process is important.

The non-oriented electrical steel sheet having a high Si concentration for which the present invention is intended is manufactured by refining (and adding Si to) molten steel, which has been tapped from a converter or an electric arc furnace, by using a vacuum degassing apparatus such as an RH vacuum degasser. In the case where a REM-containing alloy is added before the molten steel is deoxidized by utilizing Si, a large amount of REM-containing alloy is necessary, and there are risks of a decrease in yield rate and an increase in cost. To prevent such risks, it is necessary to add a REM-containing alloy after a predetermined amount of Si has been added and the molten steel has been deoxidized by utilizing Si.

In addition, since REM forms sulfides more stable than Ca, it is expected that S is fixed in the form of REM sulfides so that S is removed. To realize such an effect, it is necessary to add a REM-containing alloy before a Ca-containing alloy is added. However, since REM sulfides have a large specific weight of 5.0, REM sulfides are less likely to float in a still bath. Therefore, it is preferable that a REM-containing alloy be added in a stirred bath in which a vacuum degassing treatment is performed after deoxidation has been performed by utilizing Si. It is needless to say that the present invention does not necessarily deny the addition of a REM-containing alloy in a still bath before a Ca-containing alloy is added after the vacuum degassing treatment has been performed.

As described above, by adding a REM-containing alloy before a Ca-containing alloy is added, since it is possible to increase the amount of Ca effective for controlling the morphology of inclusions (oxides-based inclusions and sulfide-based inclusions), it is possible to achieve good morphology of inclusions (oxides-based inclusions and sulfide-based inclusions). That is, in embodiments of the present invention, when a slab used as a material for a non-oriented electrical steel sheet is manufactured, deoxidation by utilizing Si is performed during the vacuum degassing treatment, and a REM-containing alloy is added during the vacuum degassing treatment after the deoxidation by utilizing Si or before a Ca-containing alloy is added after the vacuum degassing treatment has been performed. Subsequently, a Ca-containing alloy is added to the molten steel which has been subjected to the vacuum degassing treatment and to which a REM-containing alloy has been added, and the molten steel, to which a Ca-containing alloy has been added, is continuously cast by using a continuous casting machine to obtain a slab.

In embodiments of the present invention, the reasons why the chemical composition of the non-oriented electrical steel sheet is specified as described above are as follows.

C (Carbon); 0.0050 Mass % or Less

C is an element which increases iron loss by causing magnetic aging, and there is a marked increase in iron loss in the case where the C concentration is more than 0.0050 mass %. Therefore, the C concentration is set to be 0.0050 mass % or less or preferably 0.0030 mass % or less. Here, since it is preferable that the C concentration be as small as possible, there is no particular limitation on the lower limit of the C concentration.

Si (Silicon); 1.5 Mass % to 5.0 Mass %

Si is an element which is effective for reducing iron loss by increasing the electrical resistance of steel. In particular, in embodiments of the present invention, since the amount of Al, which has the same effect as Si, is decreased, the Si concentration is set to be 1.5 mass % or more. However, in the case where the Si concentration is more than 5.0 mass %, there is a decrease in magnetic flux density, and there is a significant deterioration in manufacturability as a result of, for example, a crack being generated when cold rolling is performed due to embrittlement occurring in steel. Therefore, the upper limit of the Si concentration is set to be 5.0 mass %. It is preferable that the Si concentration be 1.5 mass % to 3.8 mass %.

Mn (Manganese); 0.2 Mass % to 3.0 Mass %

Mn is, similarly to Si, an element which is effective for reducing iron loss by increasing the electrical resistance of steel. Therefore, in embodiments of the present invention, the Mn concentration is set to be 0.2 mass % or more. On the other hand, in the case where the Mn concentration is more than 3.0 mass %, there is a decrease in magnetic flux density. Therefore, the upper limit of the Mn concentration is set to be 3.0 mass %.

Sol.Al (Acid-Soluble Aluminum); 0.0030 Mass % or Less

Al (aluminum) is, similarly to Si, an element which is effective for reducing iron loss by increasing the electrical resistance of steel. However, from the viewpoint of recycling scrap iron of the non-oriented electrical steel sheet as a raw material for foundry pig iron, it is required that the Al concentration be less than 0.05 mass %, and it is preferable that the Al concentration be as small as possible. In addition, the Al concentration is further decreased to increase a magnetic flux density by improving a texture, and the sol.Al concentration is set to be 0.0030 mass % or less, preferably 0.0020 mass % or less, or more preferably 0.0010 mass % or less. Since it is preferable that the sol.Al concentration be as small as possible, there is no particular limitation on the lower limit of the sol.Al concentration.

P (Phosphorus); 0.2 Mass % or Less

Since P is a useful element which is highly effective for increasing the hardness of steel by being added in a minute amount, P is added as needed in accordance with required hardness. However, in the case where the P is added in an excessive amount, there is a deterioration in cold rolling performance. Therefore, the upper limit of the P concentration is set to be 0.2 mass %.

S (Sulfur); 0.0050 Mass % or Less

Since S causes a deterioration in manufacturability (hot rolling performance) and the magnetic properties of a product steel sheet by forming inclusions in the form of sulfides, it is preferable that the S concentration be as small as possible. Therefore, in embodiments of the present invention, the acceptable upper limit of the S concentration is 0.0050 mass %, and it is preferable that the S concentration be 0.0025 mass % or less in the case where magnetic properties are regarded as important. Here, since it is preferable that the S concentration be as small as possible, there is no particular limitation on the lower limit of the S concentration.

N (Nitrogen); 0.0040 Mass % or Less

Since N is, similar to C described above, an element which causes a deterioration in magnetic properties, and, in particular, since such an adverse effect becomes marked in the case of low-Al containing steel, the N concentration is set to be 0.0040 mass % or less or preferably 0.0030 mass % or less. Here, since it is preferable that the N concentration be as small as possible, there is no particular limitation on the lower limit of the N concentration.

T.Ca (Total Calcium); 0.0010 Mass % to 0.0080 Mass %

Since Ca (calcium) inhibits the precipitation of sulfides having a small grain diameter such as MnS by forming sulfides having a large grain diameter in the form of CaS, Ca is effective for reducing iron loss by improving crystal grain growth. Therefore, the T.Ca concentration is set to be 0.0010 mass % or more. On the other hand, in the case where the T.Ca concentration is more than 0.0080 mass %, since there is an increase in the amounts of Ca sulfides and Ca oxides, the crystal grain growth is inhibited, which reversely results in a deterioration in the iron loss properties. Therefore, the upper limit of the T.Ca concentration is set to be 0.0080 mass %. Here, the T.Ca concentration (total calcium concentration) is the sum of the acid-soluble Ca concentration and the acid-insoluble Ca concentration in steel.

T.O (Total Oxygen); 0.0100 Mass % or Less

Regarding O (oxygen), in the case where the T.O concentration is more than 0.0100 mass %, since there is an increase in the amount of oxide-based inclusions in steel, crystal grain growth is inhibited, which results in a deterioration in the iron loss properties. Therefore, the T.O concentration is set to be 0.0100 mass % or less or preferably 0.0060 mass % or less. Here, the amount of T.O is the sum of the amount of O (oxygen) existing in steel in the form of a solid solution and the amount of O (oxygen) existing in steel in the form of oxides.

REM; 0.0001 Mass % to 0.0050 Mass %

REM is effective for improving magnetic properties by forming stable sulfides at a high temperature as described above. Moreover, it is possible to expect the supplementary effect of increasing the amount of Ca effective. Therefore, it is necessary that the REM concentration be 0.0001 mass % or more. On the other hand, in the case where the REM is added in an excessive amount, there are risks of such effects being saturated, an increase in cost, and a decrease in the melting point of oxide-based inclusions. Therefore, the upper limit of the REM concentration is set to be 0.0050 mass %.

The non-oriented electrical steel sheet according to the present invention may further contain at least one of element group A through element group C below in addition to the chemical composition described above.

Group A Consisting of One or Both Selected From Sn (Tin) and Sb (Antimony) Each in an Amount of 0.01 Mass % to 0.1 Mass %

Sn and Sb are both effective for improving magnetic properties by improving a texture. To realize such an effect, it is preferable that these elements be added separately or in combination each in an amount of 0.01 mass % or more. However, in the case where these elements are added in excessive amounts, embrittlement occurs in steel, which results in breakage and a surface defect such as a scab occurring in a steel sheet in the manufacturing process of the steel sheet. Therefore, it is preferable that the upper limit of the concentration of each of these elements be 0.1 mass %.

Group B Consisting of Mg (Magnesium) in an Amount of 0.0001 Mass % to 0.0050 Mass %

Since Mg is an element which is effective for improving magnetic properties by forming sulfides more stable than MnS and $Cu_2S$ in a high-temperature environment, Mg may be added. To realize such an effect, it is preferable that the Mg be added in an amount of 0.0001 mass % or more. On the other hand, in the case where Mg is added in an excessive amount, there are risks of such an effect being saturated and a decrease in the melting point of oxide-based inclusions. Therefore, it is preferable that the upper limit of the concentration of Mg be 0.0050 mass %.

Group C Consisting of One, Two, or all Selected from Cu (Copper), Ni (Nickel), and Cr (Chromium) Each in an Amount of 0.01 Mass % to 0.5 Mass %

Since Cu, Ni, and Cr are elements which are effective for reducing iron loss by increasing the specific resistance of a steel sheet, one, two, or all of these elements may be added. To realize such an effect, it is preferable that these elements be added each in an amount of 0.01 mass % or more. On the other hand, since these elements are more expensive than Si and Al, it is preferable that the concentration of each of these elements be 0.5 mass % or less.

In the case of the non-oriented electrical steel sheet manufactured by using the method according to embodiments of the present invention, the remainder which is different from the elements described above is Fe and inevitable impurities. However, other elements may be added as long as there is no decrease in the effects of the present invention, and, for example, it is acceptable that the V (vanadium) concentration be 0.004 mass % or less, the Nb (niobium) concentration be 0.004 mass % or less, the B (boron) concentration be 0.0005 mass % or less, the Ti concentration be 0.002 mass % or less, the Cu concentration be 0.01 mass % or less, the Ni concentration be 0.01 mass % or less, and the Cr concentration be 0.01 mass % or less, in the case where these elements are contained as inevitable impurities.

Hereafter, the chemical compositions of oxide-based inclusions existing in the non-oriented electrical steel sheet according to embodiments of the present invention will be described.

In embodiments of the present invention, to provide a non-oriented electrical steel sheet having excellent magnetic properties, it is necessary that the value of the concentration-related fractional expression ((mass % CaO+mass % REM-oxide)/(mass % CaO+mass % REM-oxide+mass % $SiO_2$+mass % $Al_2O_3$)), which is a relational expression for the concentrations of CaO and REM oxides in relation to oxide-based inclusions existing not only in a product steel sheet (finish-annealed steel sheet) but also in a hot rolled steel sheet or a slab used as a material for the product steel sheet, be 0.50 or more and that the value of the concentration-related fractional expression (mass % $Al_2O_3$/(mass % CaO+mass % REM-oxide+mass % $SiO_2$+mass % $Al_2O_3$)), which is a relational expression for the concentration of $Al_2O_3$ in relation to the above-described oxide-based inclusions, be 0.20 or less. These requirements can be satisfied in the case where the value of the mass-related fractional expression ((T.Ca+REM)/(T.O+S)), which is a relational expression for the masses of the four constituents in steel, that is, T.Ca, REM, T.O, and S, is 0.4 or more.

In the case where the chemical compositions of the above-described oxide-based inclusions do not satisfy the above-described requirements, since the oxide-based inclusions are elongated due to a decrease in the melting point of the oxide-based inclusions when hot rolling is performed, crystal grain growth is inhibited in a self-annealing process immediately after hot rolling process, a hot-rolled-steel-sheet annealing process, and a finish annealing process, which results in a deterioration in magnetic properties. It is preferable that the value of the concentration-related fractional expression ((mass % CaO+mass % REM-oxide)/(mass % CaO+mass % REM-oxide+mass % $SiO_2$+mass % $Al_2O_3$)), which is a relational expression for the concentrations of CaO and REM oxides in relation to the above-described oxide-based inclusions, be 0.6 or more and that the value of the concentration-related fractional expression (mass % $Al_2O_3$/(mass % CaO+mass % REM-oxide+mass % $SiO_2$+mass % $Al_2O_3$)), which is a relational expression for the concentration of $Al_2O_3$ in relation to the above-described oxide-based inclusions, be 0.1 or less. Here, the value of the above-described expression for the concentrations of CaO and REM oxides and the value of the above-described expression for the concentration of $Al_2O_3$ are calculated from average values obtained by observing 100 or more of oxide-based inclusions existing in a cross section (L-section) parallel to the rolling direction of the steel sheet with a scanning electron microscope (SEM) and by performing analysis on the chemical compositions thereof with an energy-dispersive X-ray spectrometer (EDX) attached to the SEM. Here, the electron beam diameter of the EDX is 1 μm.

Hereafter, the method for manufacturing a slab used as a material for the non-oriented electrical steel sheet described above will be described.

The method for manufacturing a slab used as a material for a non-oriented electrical steel sheet according to embodiments of the present invention is a method for manufacturing a slab used as a material for a non-oriented electrical steel sheet having the chemical composition described above, in which refining is performed on molten steel, which has been tapped from a converter or an electric arc furnace, by using a vacuum degassing apparatus, a Ca-containing alloy is added to the molten steel, which has been subjected to refining in the vacuum degassing apparatus, and the molten steel, to which the Ca-containing alloy has been added, is continuously cast by using a continuous casting machine to obtain a slab. In such a process for manufacturing a slab, a Si-containing substance is added to the molten steel during the refining performed by using the vacuum degassing apparatus to adjust the Si concentration in the molten steel to be 1.5 mass % to 5.0 mass %. A REM-containing alloy is added to the molten steel, whose Si concentration has been adjusted, during the refining performed by using the vacuum degassing apparatus or after finishing the refining performed by using the vacuum degassing apparatus to adjust the REM concentration in the molten steel to be 0.0001 mass % to 0.0050 mass %. Subsequently, a Ca-containing alloy is added to the molten steel, which has been subjected to refining in the vacuum degassing apparatus, and to which the REM-containing alloy has been added, in a ladle to adjust the T.Ca concentration in the molten steel to be 0.0010 mass % to 0.0080 mass %.

Hereafter, the above-described method for manufacturing a slab will be specifically described.

Molten steel, which has been prepared by using a converter or an electric arc furnace, is tapped into a ladle, and the tapped molten steel is subjected to refining under reduced pressure (referred to as a "vacuum degassing treatment") by using a vacuum degassing apparatus such as an RH vacuum degasser, which has the function of vacuum refining. By performing such a vacuum degassing treatment, C in the molten steel is removed (referred to as a "vacuum decarburization treatment") to an ultralow carbon concentration (0.0050 mass % or less) while N in the molten steel is removed (referred to as "denitrization"). Since it is necessary to perform a vacuum decarburization by using a vacuum degassing apparatus so that an ultralow carbon concentration is achieved in the molten steel, it is preferable that the molten steel be tapped from a converter or an electric arc furnace without being deoxidized.

After a C concentration in the molten steel of 0.0050 mass % or less has been achieved through the vacuum decarburization treatment, metallic Si and a Si-containing alloy (such as a Fe—Si alloy) are added to perform deoxidation by utilizing Si. After adjustment has been performed so that a predetermined Si concentration in the molten steel in a range of 1.5 mass % to 5.0 mass % is achieved, other alloy constituents such as metallic Mn are added to perform composition adjustment. In addition, in the case where a REM-containing alloy is added during the vacuum degassing treatment, the REM-containing alloy is added at the same time as or later than other alloy constituents such as metallic Mn to adjust the REM concentration. Subsequently, after oxide-based inclusions and oxysulfide-based inclusions have been removed from the molten steel through floatation separation by performing a circulation treatment for a predetermined time, the vacuum degassing treatment is finished. Here, some of alloys other than the REM-containing alloy may be added when the molten steel is tapped from a converter or an electric arc furnace. In the case where the REM-containing alloy is added after finishing the vacuum degassing treatment, the REM-containing alloy is added to the molten steel in a ladle under atmospheric pressure after the vacuum degassing treatment has been performed to adjust the REM concentration. Examples of a method for adding the REM-containing alloy under atmospheric pressure include an injection method and a method utilizing an iron-coated-wire feeder.

A Ca-containing alloy (such as a Ca—Si alloy) is added to the molten steel, which has been subjected to the vacuum degassing treatment, and to which the REM-containing alloy has been added, in a ladle under atmospheric pressure to adjust the T.Ca concentration in the molten steel to be 0.0010 mass % to 0.0080 mass % so that the value of the mass-related fractional expression ((T.Ca+REM)/(T.O+S)), which is a relational expression for the masses of the four constituents in steel, is 0.4 or more. Examples of a method for adding the Ca-containing alloy include an injection method and a method utilizing an iron-coated-wire feeder.

Here, regarding the T.Ca concentration in molten steel whose chemical composition has been adjusted, it is necessary that the value of the mass-related fractional expression ((T.Ca+REM)/(T.O+S)), which is a relational expression for the masses of the four constituents in steel, be 0.4 or more, and it is preferable that the value of the mass-related fractional expression (T.Ca/REM), which is a relational expression for the masses of the two constituents in steel, be 1.0 or more. Examples of an effective method for satisfying such requirements include one in which there is an increase in the amount of a Ca-containing alloy added to molten steel, one in which the amount of T.O in steel is decreased by taking sufficient time in the vacuum degassing treatment after deoxidation has been performed by utilizing Si, and one in which the S concentration in molten steel is decreased to 0.0025 mass % or less by performing desulfurization on molten pig iron or molten steel. In addition, examples of an effective method for improving the yield rate of Ca in molten steel and for inhibiting N entrainment from atmospheric air include one in which air is cut off by putting a lid on the ladle and blowing an inert gas such as argon gas into the molten steel when the Ca-containing alloy is added.

Subsequently, such molten steel is continuously cast by using a continuous casting machine to manufacture a slab having a predetermined thickness and a predetermined length. Here, the slab having a predetermined thickness and a predetermined length may also be manufactured by using an ingot casting-slabbing method, and the present invention does not necessarily deny a method for manufacturing a slab used as a material for a non-oriented electrical steel sheet by using an ingot casting-slabbing method.

Hereafter, the method for manufacturing the non-oriented electrical steel sheet according to embodiments of the present invention will be described.

The above-described slab used as a material for a non-oriented electrical steel sheet is subjected to hot rolling to obtain a hot-rolled steel sheet. In hot rolling, it is preferable that the slab reheating temperature (SRT) be 1000° C. to 1250° C. In the case where the SRT is higher than 1250° C., there is a decrease in economic efficiency due to an increase in energy loss, and there may be problems in a manufacturing process such as a slab sag due to a decrease in the high-temperature strength of the slab. On the other hand, in the case where the SRT is lower than 1000° C., there is an increased difficulty in performing hot rolling due to an increase in hot deformation resistance. Hot rolling after reheating has been performed may be performed under common conditions.

It is preferable that the thickness of a hot-rolled steel sheet, which is manufactured by performing hot rolling, be 1.5 mm to 2.8 mm from the viewpoint of achieving satisfactory productivity. In the case where the thickness of the steel sheet is less than 1.5 mm, there is an increase in the number of rolling problems occurring when hot rolling is performed. On the other hand, it is not preferable that the thickness be more than 2.8 mm, because this causes a deterioration in texture due to an excessive increase in rolling reduction when cold rolling is performed. It is more preferable that the thickness of the hot-rolled steel sheet be 1.7 mm to 2.4 mm.

Although hot-rolled-steel-sheet annealing after a hot rolling process may be performed or omitted, it is advantageous that such annealing is omitted from the viewpoint of decreasing manufacturing cost. Here, in the case where hot-rolled-steel-sheet annealing is omitted, it is preferable that the coiling temperature after a hot rolling process be 550° C. or higher. This is because, in the case where the coiling temperature is lower than 550° C., since there is an insufficient effect of the self-annealing of the hot-rolled steel sheet in the coiled state, there may be a case where sufficient recrystallization does not occur in the steel sheet before a cold rolling process, which results in ridging occurring and in a decrease in magnetic flux density. In the case where hot-rolled-steel-sheet annealing is omitted, it is more preferable that the coiling temperature after a hot rolling process be 600° C. or higher.

On the other hand, in the case where hot-rolled-steel-sheet annealing is performed, it is preferable that the soaking temperature in a hot-rolled-steel-sheet annealing process be 900° C. to 1150° C. This is because a rolled microstructure is retained in the case where the soaking temperature is lower than 900° C., which results in insufficient effect of improving magnetic properties. On the other hand, in the case where the soaking temperature is higher than 1150° C., since there is an increase in crystal grain diameter, cracking tends to occur in a cold rolling process, and there is an economic disadvantage. Here, it is needless to say that the coiling temperature may be 550° C. or higher, even in the case where hot-rolled-steel-sheet annealing is performed.

The above-described hot rolled steel sheet after a hot rolling process or after a hot-rolled-steel-sheet annealing process is subjected to cold rolling once, twice, or more with process annealing interposed between periods in which cold rolling is performed to obtain a cold-rolled steel sheet having a final thickness. At this time, to increase a magnetic flux density, it is preferable that so-called warm rolling, in which rolling is performed on a steel sheet whose temperature is increased to about 200° C., be performed. In addition, although there is no particular limitation on the thickness (final thickness) of the cold-rolled steel sheet, it is preferable that the thickness be 0.10 mm to 0.60 mm. This is because there is a deterioration in productivity in the case where the thickness is less than 0.10 mm. On the other hand, in the case where the thickness is more than 0.60 mm, there is an insufficient effect of reducing iron loss. To increase the effect of reducing iron loss, it is more preferable that the thickness (final thickness) of the cold-rolled steel sheet be 0.10 mm to 0.35 mm.

The above-described cold-rolled steel sheet after a cold rolling process is subjected to finish annealing by using a continuous annealing method. It is preferable that the soaking temperature in this finish annealing process be 700° C. to 1150° C. In the case where the soaking temperature is lower than 700° C., since recrystallization does not sufficiently progress, it is not possible to achieve good magnetic properties, and it is not possible to realize the effect of shape correction due to continuous annealing. On the other hand, in the case where the soaking temperature is higher than 1150° C., since there is an increase in energy loss, there is a decrease in economic efficiency.

To further reduce iron loss, it is preferable that an insulating film be formed by performing bake coating on the surface of the above-described steel sheet, which has been subjected to finish annealing. Here, in the case where it is required that good punchability be achieved, it is preferable that such an insulating film be an organic film which contains a resin. In addition, in the case where weldability is regarded as important, it is preferable that such an insulating film be a semi-organic film or an inorganic film.

As described above, according to embodiments of the present invention, by controlling the value of the mass-related fractional expression ((T.Ca+REM)/(T.O+S)), which is a relational expression for the masses of the four constituents in steel, that is, T.Ca, REM, T.O, and S, to be 0.4 or more, the formation of elongated sulfide-based inclusions in steel is inhibited, and it is possible to control oxide-based inclusions in steel to have a granular non-elongated morphology. With this, it is possible to provide a non-oriented electrical steel sheet having a high magnetic flux density and low iron loss and having such a low Al concentration so that it is excellent in terms of the recycling efficiency of scrap iron.

Example 1

In a process for manufacturing a steel slab having processes involving "a converter, an RH vacuum degasser, the addition of a Ca—Si alloy by using a wire feeder, and a continuous casting machine" in a commercial production line having a heat capacity of about 200 ton class in terms of the weight of molten steel per charge, a test was performed in such a manner that the value of the mass-related fractional expression ((T.Ca+REM)/(T.O+S)), which is a relational expression for the masses of the four constituents in steel, that is, T.Ca, REM, T.O, and S, was changed by varying the concentrations of the constituents in steel. The REM-containing alloy was added after deoxidation had been performed by utilizing Si when refining is performed by using the RH vacuum degasser. The chemical compositions for various testing conditions are given in Table 1.

TABLE 1

| | Chemical Composition of Steel (mass %) | | | | | | | | | | | |
|---|---|---|---|---|---|---|---|---|---|---|---|---|
| | C | Si | Mn | P | S | sol. Al | N | T.Ca | T.O | REM | (T.Ca + REM)/ (T.O + S) | T.Ca/ REM |
| Example 1 | 0.0018 | 1.64 | 0.38 | 0.07 | 0.0021 | 0.0008 | 0.0021 | 0.0021 | 0.0051 | 0.0029 | 0.69 | 0.72 |
| Example 2 | 0.0016 | 1.68 | 0.41 | 0.07 | 0.0025 | 0.0009 | 0.0018 | 0.0026 | 0.0045 | 0.0015 | 0.59 | 1.73 |
| Example 3 | 0.0020 | 1.62 | 0.38 | 0.07 | 0.0022 | 0.0012 | 0.0020 | 0.0036 | 0.0043 | 0.0019 | 0.85 | 1.89 |
| Example 4 | 0.0018 | 2.04 | 0.92 | 0.07 | 0.0016 | 0.0011 | 0.0016 | 0.0013 | 0.0038 | 0.0025 | 0.70 | 0.52 |
| Example 5 | 0.0023 | 2.00 | 0.89 | 0.07 | 0.0017 | 0.0013 | 0.0020 | 0.0038 | 0.0041 | 0.0014 | 0.90 | 2.71 |
| Example 6 | 0.0026 | 2.49 | 1.19 | 0.07 | 0.0018 | 0.0016 | 0.0019 | 0.0045 | 0.0036 | 0.0010 | 1.02 | 4.50 |
| Example 7 | 0.0021 | 2.58 | 1.10 | 0.07 | 0.0018 | 0.0012 | 0.0019 | 0.0034 | 0.0033 | 0.0028 | 1.22 | 1.21 |
| Example 8 | 0.0023 | 2.52 | 1.12 | 0.07 | 0.0019 | 0.0013 | 0.0020 | 0.0011 | 0.0034 | 0.0033 | 0.83 | 0.33 |
| Example 9 | 0.0017 | 3.03 | 1.30 | 0.07 | 0.0020 | 0.0010 | 0.0019 | 0.0020 | 0.0030 | 0.0022 | 0.84 | 0.91 |
| Example 10 | 0.0019 | 3.01 | 1.35 | 0.07 | 0.0016 | 0.0013 | 0.0019 | 0.0033 | 0.0032 | 0.0020 | 1.10 | 1.67 |
| Example 11 | 0.0023 | 3.06 | 1.31 | 0.07 | 0.0021 | 0.0015 | 0.0020 | 0.0043 | 0.0030 | 0.0026 | 1.35 | 1.67 |
| Example 12 | 0.0018 | 3.52 | 1.48 | 0.07 | 0.0017 | 0.0010 | 0.0018 | 0.0024 | 0.0026 | 0.0015 | 0.91 | 1.60 |
| Example 13 | 0.0015 | 3.55 | 1.45 | 0.07 | 0.0019 | 0.0011 | 0.0016 | 0.0022 | 0.0029 | 0.0029 | 1.07 | 0.75 |
| Example 14 | 0.0021 | 3.51 | 1.51 | 0.07 | 0.0014 | 0.0013 | 0.0018 | 0.0041 | 0.0027 | 0.0019 | 1.46 | 2.16 |
| Comparative Example 1 | 0.0015 | 1.66 | 0.41 | 0.07 | 0.0025 | 0.0009 | 0.0018 | 0.0011 | 0.0046 | 0.0012 | 0.32 | 0.92 |
| Comparative Example 2 | 0.0018 | 2.02 | 0.91 | 0.07 | 0.0018 | 0.0009 | 0.0016 | 0.0015 | 0.0040 | 0.0005 | 0.34 | 3.00 |
| Comparative Example 3 | 0.0016 | 2.55 | 1.19 | 0.07 | 0.0022 | 0.0010 | 0.0019 | 0.0009 | 0.0035 | 0.0012 | 0.37 | 0.75 |
| Comparative Example 4 | 0.0018 | 3.00 | 1.35 | 0.07 | 0.0016 | 0.0011 | 0.0019 | 0.0010 | 0.0033 | 0.0004 | 0.29 | 2.50 |
| Comparative Example 5 | 0.0020 | 3.54 | 1.45 | 0.07 | 0.0029 | 0.0009 | 0.0016 | 0.0021 | 0.0031 | 0.0002 | 0.38 | 10.50 |

The steel slabs, which had been obtained by performing continuous casting, were heated to a temperature of 1050° C. to 1130° C. and thereafter subjected hot rolling to obtain hot-rolled steel sheets having a thickness of 2.3 mm. At this time, the coiling temperature was 680° C. in all cases. The obtained hot-rolled steel sheets were subjected to pickling followed by cold rolling to obtain cold-rolled steel sheets having a final thickness of 0.50 mm, the cold-rolled steel sheets were subjected to finish annealing under the condition of a soaking temperature of 1000° C., and the annealed steel sheets were covered with insulating films by performing bake coating to obtain non-oriented electrical steel sheets (product steel sheets).

The cross section (L-section) parallel to the rolling direction of the product steel sheet obtained as described above was observed with a scanning electron microscope (SEM) to analyze the chemical compositions of 100 or more of oxide-based inclusions. From the average values calculated from the values obtained through the analysis, the value of the concentration-related fractional expression ((mass % CaO+mass % REM-oxide)/(mass % CaO+mass % REM-oxide+mass % $SiO_2$+mass % $Al_2O_3$)), which is a relational expression for the concentrations of CaO and REM oxides in relation to oxide-based inclusions, and the value of the concentration-related fractional expression (mass % $Al_2O_3$/(mass % CaO+mass % REM-oxide+mass % $SiO_2$+mass % $Al_2O_3$)), which is a relational expression for the concentration of $Al_2O_3$ in relation to oxide-based inclusions, were calculated.

In addition, the average crystal grain diameter of the product steel sheet described above was determined. The average crystal grain diameter was derived by determining the average cross-sectional area of the crystal grains by using a comparison method or an intercept method prescribed in JIS G 0552 "Methods of ferrite grain determination test for steel", and by defining the circle-equivalent diameter of the obtained area as the average crystal grain diameter. Moreover, an Epstein test pieces were taken in the rolling direction and in a direction orthogonal to the rolling direction of the product steel sheet described above to determine the magnetic flux density $B_{50}$ (magnetic flux density under the condition of a magnetizing force of 5000 A/m) and the iron loss $W_{15/50}$ (iron loss when excited under the conditions of a magnetic flux density of 1.5 T and a frequency of 50 Hz) in accordance with JIS C 2552.

The analysis results of the inclusions described above and the determination results of the average crystal grain diameter, the magnetic flux density $B_{50}$, and the iron loss $W_{15/50}$ are given in Table 2.

TABLE 2

| | Concentration-related Fractional Expression for Inclusion | | Average Crystal Grain Diameter after Finish Annealing (μm) | Magnetic Property of Steel Sheet | |
|---|---|---|---|---|---|
| | $(C + R)^{(Note\ 1)}/$ $(C + R + S + A)$ | $A^{(Note\ 2)}/$ $(C + R + S + A)$ | | Iron Loss $W_{15/50}$ (W/kg) | Magnetic Flux Density $B_{50}$ (T) |
| Example 1 | 0.62 | 0.07 | 50 | 2.87 | 1.708 |
| Example 2 | 0.51 | 0.17 | 46 | 2.85 | 1.710 |
| Example 3 | 0.63 | 0.09 | 66 | 2.79 | 1.718 |
| Example 4 | 0.58 | 0.12 | 55 | 2.78 | 1.717 |
| Example 5 | 0.61 | 0.11 | 71 | 2.67 | 1.723 |
| Example 6 | 0.67 | 0.06 | 78 | 2.54 | 1.729 |
| Example 7 | 0.72 | 0.06 | 93 | 2.50 | 1.728 |
| Example 8 | 0.61 | 0.08 | 64 | 2.64 | 1.725 |
| Example 9 | 0.59 | 0.10 | 65 | 2.53 | 1.731 |
| Example 10 | 0.70 | 0.05 | 84 | 2.42 | 1.735 |
| Example 11 | 0.76 | 0.02 | 103 | 2.37 | 1.737 |
| Example 12 | 0.60 | 0.11 | 70 | 2.36 | 1.736 |
| Example 13 | 0.66 | 0.07 | 82 | 2.40 | 1.733 |
| Example 14 | 0.73 | 0.03 | 111 | 2.26 | 1.742 |
| Comparative Example 1 | 0.41 | 0.24 | 27 | 3.56 | 1.669 |
| Comparative Example 2 | 0.39 | 0.25 | 29 | 3.42 | 1.676 |
| Comparative Example 3 | 0.35 | 0.28 | 30 | 3.28 | 1.681 |
| Comparative Example 4 | 0.34 | 0.30 | 24 | 3.16 | 1.688 |
| Comparative Example 5 | 0.42 | 0.23 | 32 | 3.11 | 1.691 |

(Note 1)$(C + R)/(C + R + S + A)$; {(mass % CaO) + (mass % REM-oxide)}/{(mass % CaO) + (mass % REM-oxide) + (mass % $SiO_2$) + (mass % $Al_2O_3$)}

(Note 2)$A/(C + R + S + A)$; (mass % $Al_2O_3$)/{(mass % CaO) + (mass % REM-oxide) + (mass % $SiO_2$) + (mass % $Al_2O_3$)}

As indicated in Table 2, it is clear that the steel sheets, which conformed to embodiments of the present invention, (examples 1 through 14) had low iron loss represented by an iron loss $W_{15/50}$ of 2.87 W/kg or less, a good magnetic flux density represented by a magnetic flux density $B_{50}$ of 1.708 T or more, which means that the examples had excellent magnetic properties. Conversely, it is clear that the magnetic properties of the steel sheets of the comparative examples 1 through 5, which did not conform to embodiments of the present invention, were poor in terms of iron loss $W_{15/50}$ and/or magnetic flux density $B_{50}$.

Example 2

By using the same process for manufacturing a steel slab as in the case of EXAMPLE 1, steel slabs having the chemical compositions given in Table 3, which conformed to embodiments of the present invention, were manufactured. However, the manufacturing conditions were classified into two groups in accordance with the timing of the addition of the REM-containing alloy, that is, the alloy was added in the RH vacuum degasser after deoxidation had been performed by utilizing Si in one case, and the alloy was added before the Ca-containing alloy was added after the treatment in the RH vacuum degasser had been performed in the other case.

TABLE 3

| | Chemical Composition of Steel (mass %) | | | | | | | | | | | | |
|---|---|---|---|---|---|---|---|---|---|---|---|---|---|
| | C | Si | Mn | P | S | sol. Al | N | T.Ca | T.O | REM | (T.Ca + REM)/ (T.O + S) | T.Ca/ REM | Timing of Addition of REM-containing Alloy |
| Example 21 | 0.0017 | 1.60 | 0.48 | 0.07 | 0.0022 | 0.0010 | 0.0020 | 0.0021 | 0.0046 | 0.0024 | 0.66 | 0.88 | during RH Treatment and after Deoxidation Utilizing Si |
| Example 22 | 0.0020 | 1.99 | 0.91 | 0.07 | 0.0016 | 0.0013 | 0.0021 | 0.0028 | 0.0041 | 0.0031 | 1.04 | 0.90 | during RH Treatment and after Deoxidation Utilizing Si |
| Example 23 | 0.0024 | 2.55 | 1.12 | 0.07 | 0.0017 | 0.0015 | 0.0018 | 0.0046 | 0.0036 | 0.0018 | 1.21 | 2.56 | during RH Treatment and after Deoxidation Utilizing Si |
| Example 24 | 0.0018 | 3.54 | 1.40 | 0.07 | 0.0020 | 0.0009 | 0.0017 | 0.0034 | 0.0030 | 0.0020 | 1.09 | 1.67 | during RH Treatment and after Deoxidation Utilizing Si |
| Example 25 | 0.0017 | 1.66 | 0.42 | 0.07 | 0.0021 | 0.0008 | 0.0019 | 0.0015 | 0.0046 | 0.0028 | 0.64 | 0.54 | after RH Treatment and before Addition of Ca |
| Example 26 | 0.0021 | 2.03 | 0.87 | 0.07 | 0.0014 | 0.0016 | 0.0020 | 0.0038 | 0.0041 | 0.0041 | 1.44 | 0.93 | after RH Treatment and before Addition of Ca |
| Example 27 | 0.0022 | 2.50 | 1.16 | 0.07 | 0.0019 | 0.0010 | 0.0020 | 0.0043 | 0.0036 | 0.0009 | 0.95 | 4.78 | after RH Treatment and before Addition of Ca |
| Example 28 | 0.0021 | 2.98 | 1.31 | 0.07 | 0.0018 | 0.0009 | 0.0018 | 0.0030 | 0.0030 | 0.0014 | 0.92 | 2.14 | after RH Treatment and before Addition of Ca |

The obtained steel slabs were made into non-oriented electrical steel sheets (product steel sheets) by using the same method as in the case of EXAMPLE 1. For the obtained product steel sheets, by using the same method as in the case of EXAMPLE 1, the value of the concentration-related fractional expression ((mass % CaO+mass % REM-oxide)/(mass % CaO+mass % REM-oxide+mass % $SiO_2$+ mass % $Al_2O_3$)), which is a relational expression for the concentrations of CaO and REM oxides in relation to oxide-based inclusions, and the value of the concentration-related fractional expression (mass % $Al_2O_3$/(mass % CaO+ mass % REM-oxide+mass % $SiO_2$+mass % $Al_2O_3$)), which is a relational expression for the concentration of $Al_2O_3$ in relation to oxide-based inclusions, were calculated, and the average crystal grain diameter, the magnetic flux density $B_{50}$, and the iron loss $W_{15/50}$ were determined.

The analysis results of the inclusions described above and the determination results of the average crystal grain diameter, the magnetic flux density $B_{50}$, and the iron loss $W_{15/50}$ are given in Table 4.

TABLE 4

| | Concentration-related Fractional Expression for Inclusion | | Average Crystal Grain Diameter after Finish Annealing (μm) | Magnetic Property of Steel Sheet | |
|---|---|---|---|---|---|
| | $(C+R)^{(Note\ 1)}/$ $(C+R+S+A)$ | $A^{(Note\ 2)}/$ $(C+R+S+A)$ | | Iron Loss $W_{15/50}$ (W/kg) | Magnetic Flux Density $B_{50}$ (T) |
| Example 21 | 0.58 | 0.13 | 48 | 2.62 | 1.716 |
| Example 22 | 0.68 | 0.09 | 73 | 2.44 | 1.723 |
| Example 23 | 0.71 | 0.05 | 85 | 2.29 | 1.732 |
| Example 24 | 0.66 | 0.06 | 77 | 2.06 | 1.745 |
| Example 25 | 0.52 | 0.15 | 42 | 2.90 | 1.708 |
| Example 26 | 0.75 | 0.02 | 88 | 2.61 | 1.726 |
| Example 27 | 0.64 | 0.09 | 58 | 2.42 | 1.731 |
| Example 28 | 0.63 | 0.08 | 59 | 2.44 | 1.730 |

(Note 1) $(C+R)/(C+R+S+A)$; {(mass % CaO) + (mass % REM-oxide)}/{(mass % CaO) + (mass % REM-oxide) + (mass % $SiO_2$) + (mass % $Al_2O_3$)}
(Note 2) $A/(C+R+S+A)$; (mass % $Al_2O_3$)/{(mass % CaO) + (mass % REM-oxide) + (mass % $SiO_2$) + (mass % $Al_2O_3$)}

As indicated in Table 4, it is clear that the steel sheets, which were manufactured by adding the REM-containing alloy during the treatment in the RH vacuum degasser after deoxidation had been performed by utilizing Si (examples 21 through 24), had low iron loss represented by an iron loss $W_{15/50}$ of 2.62 W/kg or less, a high magnetic flux density represented by a magnetic flux density $B_{50}$ of 1.716 T or more, which means that such examples had an excellent magnetic properties as compared to the steel sheets, which were manufactured by adding the REM-containing alloy before the Ca-containing alloy was added after the treatment in the RH vacuum degasser had been performed (examples 25 through 28).

The invention claimed is:

1. A non-oriented electrical steel sheet having
a chemical composition containing C; 0.0050 mass % or less, Si; 1.5 mass % to 5.0 mass %, Mn; 0.2 mass % to 3.0 mass %, sol.Al; 0.0030 mass % or less, P; 0.2 mass % or less, S; 0.0050 mass % or less, N; 0.0040 mass % or less, T.Ca; 0.0010 mass % to 0.0080 mass %, T.O; 0.0100 mass % or less, REM; 0.0001 mass % to 0.0050 mass %, and a balance of Fe and inevitable impurities,
wherein a value of a mass-related fractional expression ((T.Ca+REM)/(T.O+S)), which is a relational expression for masses of four constituents including T.Ca, REM, T.O, and S, is 0.4 or more.

2. The non-oriented electrical steel sheet according to claim 1, wherein a value of a mass-related fractional expression (T.Ca/REM), which is a relational expression for masses of two constituents including T.Ca and REM, is 1.0 or more.

3. The non-oriented electrical steel sheet according to claim 1, wherein an average crystal grain diameter of a metallographic structure is 40 μm or more.

4. The non-oriented electrical steel sheet according to claim 2, wherein an average crystal grain diameter of a metallographic structure is 40 μm or more.

5. A non-oriented electrical steel sheet having
a chemical composition containing C; 0.0050 mass % or less, Si; 1.5 mass % to 5.0 mass %, Mn; 0.2 mass % to 3.0 mass %, sol.Al; 0.0030 mass % or less, P; 0.2 mass % or less, S; 0.0050 mass % or less, N; 0.0040 mass % or less, T.Ca; 0.0010 mass % to 0.0080 mass %, T.O; 0.0100 mass % or less, REM; 0.0001 mass % to 0.0050 mass %, at least one of element group A through element group C below, and a balance of Fe and inevitable impurities,
wherein a value of a mass-related fractional expression ((T.Ca+REM)/(T.O+S)), which is a relational expression for masses of four constituents including T.Ca, REM, T.O, and S, is 0.4 or more, where
group A consists of one or both selected from Sn and Sb each in an amount of 0.01 mass % to 0.1 mass %,
group B consists of Mg in an amount of 0.0001 mass % to 0.0050 mass %, and
group C consists of one, two, or all selected from Cu, Ni, and Cr each in an amount of 0.01 mass % to 0.5 mass %.

6. The non-oriented electrical steel sheet according to claim 5, wherein a value of a mass-related fractional expression (T.Ca/REM), which is a relational expression for masses of two constituents including T.Ca and REM, is 1.0 or more.

7. The non-oriented electrical steel sheet according to claim 5, wherein an average crystal grain diameter of a metallographic structure is 40 μm or more.

8. The non-oriented electrical steel sheet according to claim 6, wherein an average crystal grain diameter of a metallographic structure is 40 μm or more.

* * * * *

UNITED STATES PATENT AND TRADEMARK OFFICE
CERTIFICATE OF CORRECTION

| | | |
|---|---|---|
| PATENT NO. | : 12,146,209 B2 | Page 1 of 1 |
| APPLICATION NO. | : 17/281075 | |
| DATED | : November 19, 2024 | |
| INVENTOR(S) | : Akifumi Harada et al. | |

It is certified that error appears in the above-identified patent and that said Letters Patent is hereby corrected as shown below:

On the Title Page

Column 2, Line 5, under FOREIGN PATENT DOCUMENTS, "EP 3214198 A1" should read -- EP 3214195 A1 --.

Signed and Sealed this
Twenty-second Day of April, 2025

Coke Morgan Stewart
*Acting Director of the United States Patent and Trademark Office*